US012764370B2

(12) United States Patent
Khanna

(10) Patent No.: US 12,764,370 B2
(45) Date of Patent: Oct. 13, 2026

(54) SYSTEMS AND METHODS FOR EXTENDING RECORDINGS FOR MEDIA CONTENT BASED ON AGGREGATING USER DATA

(71) Applicant: Adeia Guides Inc., San Jose, CA (US)

(72) Inventor: Rajesh Khanna, Los Gatos, CA (US)

(73) Assignee: Adeia Guides Inc., San Jose, CA (US)

( * ) Notice: Subject to any disclaimer, the term of this patent is extended or adjusted under 35 U.S.C. 154(b) by 103 days.

(21) Appl. No.: 18/675,912

(22) Filed: May 28, 2024

(65) Prior Publication Data

US 2024/0397132 A1 Nov. 28, 2024

Related U.S. Application Data

(63) Continuation of application No. 17/583,715, filed on Jan. 25, 2022, now Pat. No. 12,034,990, which is a continuation of application No. 16/634,502, filed as application No. PCT/US2017/044239 on Jul. 27, 2017, now Pat. No. 11,265,590.

(51) Int. Cl.
*H04N 21/262* (2011.01)
*H04N 21/235* (2011.01)
*H04N 21/24* (2011.01)
*H04N 21/442* (2011.01)

(52) U.S. Cl.
CPC ... *H04N 21/26241* (2013.01); *H04N 21/2353* (2013.01); *H04N 21/2407* (2013.01); *H04N 21/26258* (2013.01); *H04N 21/26283* (2013.01); *H04N 21/44226* (2020.08)

(58) Field of Classification Search
CPC ....... H04N 21/26241; H04N 21/26283; H04N 21/26258; H04N 21/282; H04N 21/44226; H04N 21/2353; H04N 21/2407
See application file for complete search history.

(56) References Cited

U.S. PATENT DOCUMENTS

| | | | |
|---|---|---|---|
| 6,239,794 | B1 | 5/2001 | Yuen et al. |
| 6,564,378 | B1 | 5/2003 | Satterfield et al. |
| 7,165,098 | B1 | 1/2007 | Boyer et al. |
| 7,761,892 | B2 | 7/2010 | Ellis et al. |
| 8,046,801 | B2 | 10/2011 | Ellis et al. |
| 11,265,590 | B2 | 3/2022 | Khanna |
| 12,034,990 | B2 | 7/2024 | Khanna |
| 2002/0174430 | A1 | 11/2002 | Ellis et al. |

(Continued)

OTHER PUBLICATIONS

International Search Report and Written Opinion in Application No. PCT/US2017/044239, dated Apr. 4, 2018 (13 pages).

*Primary Examiner* — Ngoc K Vu
(74) *Attorney, Agent, or Firm* — HG Law LLP

(57) ABSTRACT

Systems and methods are provided for determining whether to extend a recording of a media asset based on analyzing user data. A media guidance application may determine that a media asset is recording during a scheduled time slot that has a start time and an end time. The media guidance application may determine that the media asset will be transmitted outside of the scheduled time slot based on inputs from a plurality of users. In response to determining that the media asset will be transmitted outside of the scheduled time, the media guidance application may extend the recording of the media asset beyond the scheduled time slot by a predetermined amount of time.

16 Claims, 10 Drawing Sheets

(56) References Cited

U.S. PATENT DOCUMENTS

| | | | |
|---|---|---|---|
| 2005/0251827 | A1 | 11/2005 | Ellis et al. |
| 2007/0172196 | A1* | 7/2007 | Kusunoki .............. H04N 5/782 386/297 |
| 2007/0183743 | A1 | 8/2007 | Tanikawa et al. |
| 2007/0286582 | A1* | 12/2007 | Dolph ...................... H04N 5/76 386/294 |
| 2008/0250447 | A1 | 10/2008 | Rowe et al. |
| 2008/0307485 | A1 | 12/2008 | Clement et al. |
| 2011/0286719 | A1 | 11/2011 | Woods |
| 2013/0170819 | A1 | 7/2013 | Dykeman et al. |
| 2014/0337893 | A1 | 11/2014 | Roe |
| 2016/0019017 | A1* | 1/2016 | Walker ............... H04N 21/4316 348/553 |
| 2016/0309227 | A1 | 10/2016 | Casagrande |
| 2018/0070146 | A1 | 3/2018 | Curtis et al. |
| 2020/0236415 | A1 | 7/2020 | Khanna |
| 2022/0150563 | A1 | 5/2022 | Khanna |

* cited by examiner

SYSTEMS AND METHODS FOR EXTENDING RECORDINGS FOR MEDIA CONTENT BASED ON AGGREGATING USER DATA

CROSS-REFERENCE TO RELATED APPLICATION

This application is a continuation of U.S. patent application Ser. No. 17/583,715, filed Jan. 25, 2022, which is a continuation of U.S. patent application Ser. No. 16/634,502, filed Jan. 27, 2020, now U.S. Pat. No. 11,265,590, which is a national stage application under 35 U.S.C. § 371 of International Application No. PCT/US2017/044239, filed Jul. 27, 2017, the disclosures of which are incorporated by reference in their entireties.

BACKGROUND

Recording live programming is very popular as of late in all forms of media content. For example, recording broadcasts of live sporting events is extremely popular with viewers. Often, live programming may extend past the scheduled broadcast time slot, which creates recordings that only contain only a partial amount of the live program. The related art describes various ways of extending the recording, which include statically extending the recording by a predetermined amount after determining from parsed internet data that the live program will extend past the scheduled broadcast time. The related art does not account for extending the recording dynamically using the data from inputs from a plurality of users. For example, in prior systems extending the recording of the live program may be very inefficient because they require an excess amount of processing to parse internet data to determine that the live program will extend past the scheduled broadcast time.

SUMMARY

Systems and methods are provided herein for determining whether to extend a recording of a media asset based on analyzing user data. For example, if a user wants to view a live sporting event, such as a Major League Baseball game, the user may request to record the game on the user's DVR (Digital Video Recorder). The baseball game may go to extra innings and be longer than the scheduled time slot. Based on inputs from users watching the game live, the user's baseball game recording may be automatically extended to ensure that the full game is contained within the recording.

To this end and others, in some aspects of the disclosure, a media guidance application may determine that a media asset is recording during a scheduled time slot that has a start time and an end time. For example, the media guidance application may compare the media asset with scheduled recording data to determine if the media asset is scheduled to record.

The media guidance application may retrieve inputs from a plurality of users. For example, the media guidance application may retrieve inputs from a plurality of users corresponding to the users' recording history, the users' currently tuned channel, etc. The media guidance application may store the inputs in a database. For example, the media guidance application may store the inputs (e.g., recording data, channel tuning data, etc.) in a database.

The media guidance application may retrieve, from the database, inputs from users related to the media asset. For example, if the media asset is a San Francisco Giants versus Los Angeles Dodgers baseball game, the media guidance application may retrieve inputs from users related to the baseball game.

In some embodiments, when the media guidance application is retrieving, from the database, inputs from users related to the media asset, the media guidance application may retrieve metadata for the media asset. For example, the media guidance application may retrieve metadata (e.g., title, runtime, sport, etc.) from the media guidance data for the media asset (e.g., the Giants vs. Dodgers baseball game).

The media guidance application may compare the metadata for the media asset with the inputs from the users in the database. For example, the media guidance application may compare the metadata (e.g., title, runtime, sport, channel, etc.) with the inputs (e.g., recording data, channel data, title data, etc.) from the users in the database.

The media guidance application may determine, from the comparison, inputs from the users that match the metadata. For example, the media guidance application may determine, from the comparison, inputs from the users (e.g., inputs from users viewing the Giants vs. Dodgers baseball game) that match the metadata (e.g., metadata for the Giants vs. Dodgers baseball game).

The media guidance application may determine that the inputs that match the metadata are the inputs from users related to the media asset. For example, the media guidance application may determine that inputs that match the metadata (e.g., inputs from users viewing the Giants vs. Dodgers baseball game) are the inputs from the users related to the media asset (e.g., the Giants vs. Dodgers baseball game).

Based on the inputs, the media guidance application may search the database for information related to the inputs from the users. For example, the media guidance application may search the database for recording information, channel tuning information, etc., related to the inputs from the users.

The media guidance application may determine, from the information, candidate inputs that contain information indicating that the media asset will be transmitted outside of the scheduled time slot. For example, the media guidance application may determine from the recording information that the users extended the recording of the baseball game when watching the game live.

In some embodiments, when the media guidance is determining, from the information, candidate inputs that contain information indicating that the media asset will be transmitted outside of the scheduled time slot, the media guidance application may determine, from the information, candidate inputs in the plurality of inputs, where the information for the candidate inputs reflects that the media asset recording during the scheduled time slot is adjusted to a second end time. For example, the media guidance application may determine candidate inputs whose corresponding information (e.g., inputs where the users watching the baseball game live extended recording) indicates that the media asset (e.g., the Giants vs. Dodgers baseball game) recording during the scheduled time slot is adjusted to a second end time.

In some embodiments, when the media guidance is determining, from the information, candidate inputs that contain information indicating that the media asset will be transmitted outside of the scheduled time slot, the media guidance application may determine, from the information, candidate inputs in the plurality of inputs, where the information for the candidate inputs reflects that a user corresponding to each candidate input remains tuned to a content source that transmits the media asset after the end time. For example, the media guidance application may determine candidate inputs whose corresponding information (e.g., inputs where the users watching the baseball game do not tune to a different channel after the end of the scheduled time slot) indicates that the user corresponding to the candidate input remains tuned to the baseball game.

In some embodiments, the media guidance application may determine, from the candidate inputs, that the media asset will be transmitted outside of the scheduled time slot by determining that a user corresponding to a candidate input did not tune to a different channel, even though the currently scheduled program in the program database does not match the user profile. The media guidance application may retrieve the currently scheduled program for the channel that the media asset was aired on from the program database in the guidance data. The media guidance application may retrieve the user's currently tuned program from the user profile.

The media guidance application may compare the two programs to determine if they are a match. As described herein, the media guidance application determines that there is a "match" when two pieces of data (e.g., metadata and user input) from two distinctly different sources are the same. In the event that the programs do not match, the media guidance application may determine, by retrieving from command history data from the guidance data, whether the user completed any channel tuning commands on user input interface 410 after the scheduled end time of the media asset. In response to determining that the user did not complete any channel tuning commands, the media guidance application may determine that the user remained tuned to the channel broadcasting the media asset, even though the programs do not match.

The media guidance application may determine, from the candidate inputs, that the media asset will be transmitted outside of the scheduled time slot. For example, the media guidance application may determine, from the candidate inputs (e.g., the recording data and channel data) that the Giants vs. Dodgers game will be transmitted outside of the scheduled time slot.

In some embodiments, when the media guidance application is determining, from the candidate inputs, that the media asset will be transmitted outside of the scheduled time slot, the media guidance application may determine, using a model, whether the candidate inputs show that the media asset will be transmitted outside of the scheduled time slot. For example, the media guidance application may use a confidence analysis to determine whether the candidate inputs show that the media asset (e.g., the Giants vs. Dodgers baseball game) will be transmitted outside of the scheduled time.

The media guidance application may use a confidence analysis as the model. The media guidance may determine, from the confidence analysis, a confidence score. For example, the media guidance application may determine, from a confidence analysis algorithm, a confidence score (e.g., a score between 1-100) for the Giants vs. Dodgers baseball game.

The media guidance application may determine, from the confidence score, whether the media asset will be transmitted outside of the scheduled time slot. For example, the media guidance application may compare the confidence score with a threshold confidence score to determine if the Giants vs. Dodgers baseball game will be transmitted outside of the scheduled time slot.

In some embodiments, when the media guidance application is determining, from the confidence score, whether the media asset will be transmitted outside of the scheduled time slot, the media guidance application may retrieve a threshold percentage. For example, the media guidance application may retrieve a default threshold percentage from the media guidance data, which may be adjustable based on user input.

The media guidance application may compare the confidence score with the threshold percentage. For example, the media guidance application may determine that the Giants vs. Dodgers game has a confidence score of 90, and may compare the confidence score with a threshold percentage (e.g., 75%) that may be retrieved from the media guidance data.

In response to determining that the confidence score exceeds the threshold percentage, the media guidance application may determine that the media asset will be transmitted outside of the scheduled time slot. For example, the media guidance application may determine that the Giants vs. Dodgers baseball game will be transmitted outside of the scheduled time slot due to the confidence score (e.g., 90) exceeding the threshold percentage (e.g., 75%).

In response to determining that the confidence score does not exceed the threshold percentage, the media guidance application may determine that the media asset will not be transmitted outside of the scheduled time slot. For example, the media guidance application may determine that the Giants vs. Dodgers baseball game will not be transmitted outside of the scheduled time slot due to the confidence score (e.g., may be 50) not exceeding the threshold percentage (e.g., 75%).

In response to determining that the media asset will be transmitted outside of the scheduled time, the media guidance application may extend the recording of the media asset beyond the scheduled time slot by a predetermined amount of time. For example, the media guidance application may extend the recording of the Giants vs. Dodgers game by the average recording extension time calculated based on the candidate inputs.

In some embodiments, when, in response to determining that the media asset will be transmitted outside of the scheduled time, the media guidance application extends the recording of the media asset beyond the scheduled time slot by a predetermined amount of time, the media guidance application may retrieve, from a user profile, a default recording extension time. For example, the media guidance application may retrieve a default recording extension time (e.g., may be 15 minutes) from the user profile.

The media guidance application may select the default recording extension time to be the predetermined time. For example, the media guidance may select the default recording extension time (e.g., 15 minutes) to be the predetermined time.

The media guidance application may add the predetermined time to the end time, to create a second end time. For example, the media guidance application may add the predetermined time (e.g., 15 minutes) to the end time (e.g., may be 10:00 pm), to create a second end time (e.g., 10:15 pm).

The media guidance application may adjust the recording of the media asset to record from the start time to the second end time. For example, the media guidance application may adjust the recording of the Giants vs. Dodgers baseball game to record from the start time (e.g., 7:00 pm) to the second end time (e.g., 10:15 pm).

In some embodiments, when, in response to determining that the media asset will be transmitted outside of the scheduled time, the media guidance application extends the recording of the media asset beyond the scheduled time slot by a predetermined amount of time, the media guidance application may determine, from the candidate inputs, an average time the candidate inputs extended the recording of the media asset. For example, the media guidance application may determine from the candidate inputs' recording data that the candidate inputs extended the recording of the Giants vs. Dodgers baseball game by 22 minutes.

The media guidance application may select the average time to be the predetermined time. For example, the media guidance application may select the predetermined time to be the average time of 22 minutes.

The media guidance application may add the predetermined time to the end time to create a second end time. For example, the media guidance application may add the predetermined time (e.g., 22 minutes) to the end time (e.g., may be 10:00 pm), to create a second end time (e.g., 10:22 pm).

The media guidance application may adjust the recording of the media asset to record from the start time to the second end time. For example, the media guidance application may adjust the recording of the Giants vs. Dodgers baseball game to record from the start time (e.g., 7:00 pm) to the second end time (e.g., 10:22 pm).

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are provided herein for determining whether to extend a recording of a media asset based on analyzing user data. The media guidance application may determine that a media asset is recording during a scheduled time slot that has a start time and an end time. The media guidance application may determine that the media asset will be transmitted outside of the scheduled time slot based on inputs from a plurality of users. And in response to determining that the media asset will be transmitted outside of the scheduled time, the media guidance application may extend the recording of the media asset beyond the scheduled time slot by a predetermined amount of time.

Figure 1:
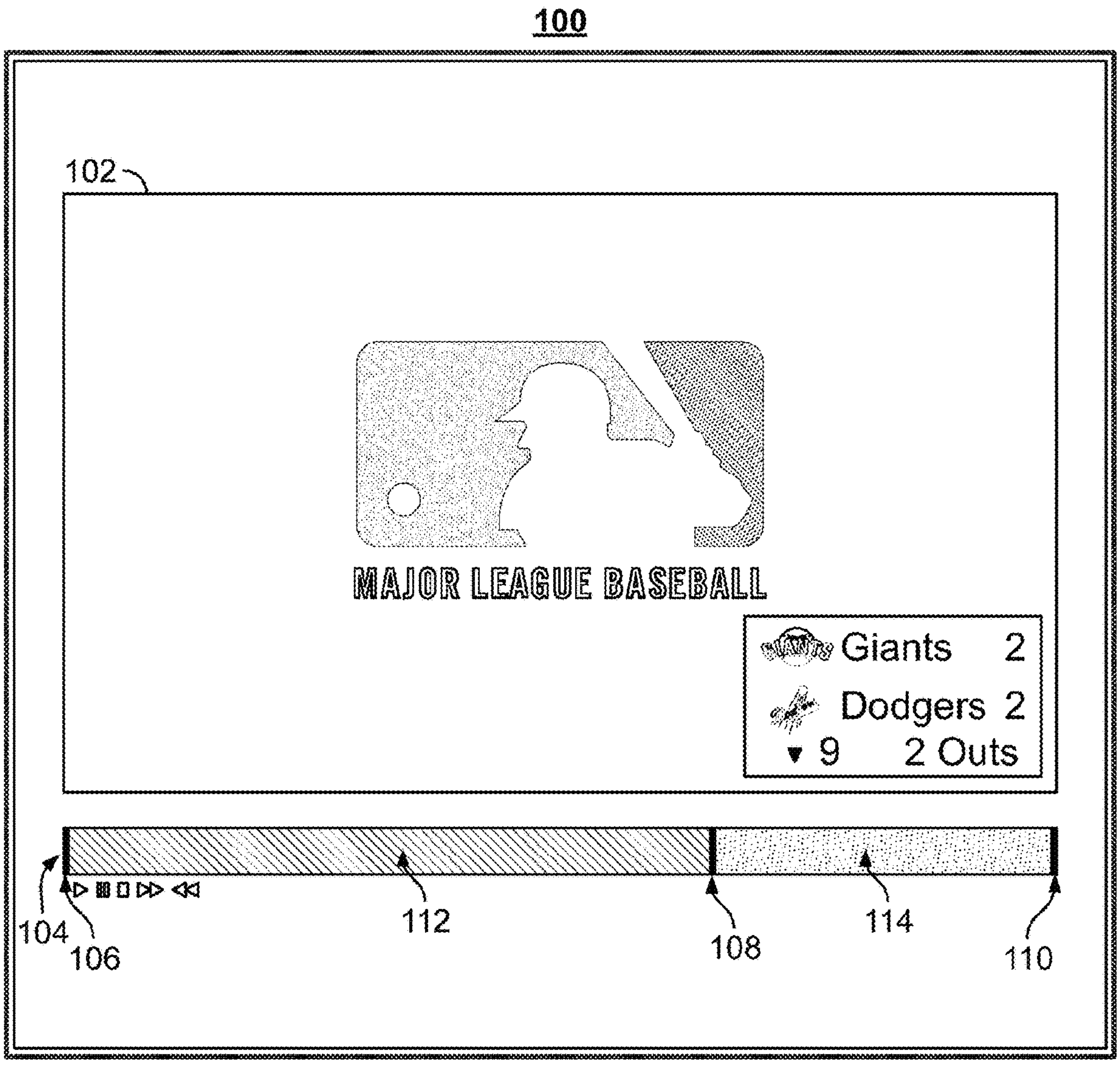
FIG. 1 depicts an illustrative embodiment of a display screen of user equipment that is playing back live programming content, in accordance with some embodiments of the disclosure.

FIG. 1 depicts an illustrative embodiment of a display screen of user equipment that is playing back live programming content, in accordance with some embodiments of the disclosure. FIG. 1 depicts an illustrative display 100, which may be presented by control circuitry that executes a media guidance application on any user equipment. The functionality of user equipment, control circuitry, and the media guidance application is described in further detail with respects to FIGS. 2-5.

The media guidance application may play back media asset 102 on user equipment 100, which may occur when a user requests to play back media asset 102. The media guidance application may generate recording progress bar 104 that allows the viewer to access playback features (e.g., play, pause, stop, rewind, fast-forward, etc.), as well as visually displaying the location of the recording of the media asset in playback in a scheduled time slot, which may have start time 106 and end time 108. The media guidance application may determine to extend the recording from end time 108 to end time 110. End time 110 may correspond to a time outside of the scheduled time slot. The media guidance application may generate recording progress 112, which corresponds to the recording in the scheduled time slot without any extension. Recording progress 112 may be displayed inside progress bar 104. The media guidance application may generate extended recording progress 114, which corresponds to the additional recording added to recording progress 112 after adjusting the recording. Extended recording progress 114 may be displayed inside progress bar 104.

In some embodiments, a media guidance application may determine that a media asset is recording during a scheduled time slot that has a start time and an end time. The media guidance application may retrieve, from the guidance data, recording data. The media guidance application may determine, from the recording data, the scheduled recording data. The media guidance application may compare the media asset to scheduled recording data, to determine whether the scheduled recording data contains an entry for the media asset corresponding to the scheduled time slot. In response to determining that the scheduled recording data contains an entry corresponding to the media asset in the scheduled time slot, the media guidance application may determine that the media asset is recording during the scheduled time slot. For example, the media guidance application may retrieve, from the guidance data, scheduled recording data. The media guidance application may compare the media asset (e.g., the Giants vs. Dodgers game) with the scheduled recording data. The media guidance application may determine that the scheduled recording data contains an entry (e.g., Giantsvs.Dodgers:7:00-10:00pm:ESPN) corresponding to the media asset (e.g., the Giants vs. Dodgers baseball game). In response to determining that the scheduled recording data contains an entry for the media asset, the media guidance application may determine that the media asset (e.g., the Giants vs. Dodgers baseball game) is recording during the scheduled time slot.

The media guidance application may retrieve inputs from a plurality of users. The media guidance application may retrieve inputs from a plurality of users from the guidance data. For example, the media guidance application may retrieve inputs from a plurality of users corresponding to the users' recording history, the users' currently tuned channel, etc., from the guidance data. The media guidance application may store the inputs in a database. For example, the media guidance application may store the inputs (e.g., recording data, channel tuning data, etc.) in a database in the guidance data.

The media guidance application may retrieve, from the database, inputs from users related to the media asset. The media guidance application may retrieve inputs from the users related to the media asset using the methods described below.

In some embodiments, when the media guidance application is retrieving, from the database, inputs from users related to the media asset, the media guidance application may retrieve metadata for the media asset. The media guidance application may retrieve metadata for the media asset from the guidance data. For example, the media guidance application may retrieve metadata (e.g., title, runtime, sport, etc.) from the media guidance data for the media asset (e.g., the Giants vs. Dodgers baseball game).

The media guidance application may compare the metadata for the media asset with the inputs from the users in the database. For example, the media guidance application may compare the metadata (e.g., title, runtime, sport, channel, etc.) with the inputs (e.g., recording data, channel data, title data, etc.) from the users in the database.

The media guidance application may determine, from the comparison, inputs from the users that match the metadata. For example, the media guidance application may determine, from the comparison, inputs from the users (e.g., inputs from users viewing the Giants vs. Dodgers baseball game) that match the metadata (e.g., metadata for the Giants vs. Dodgers baseball game).

The media guidance application may determine that the inputs that match the metadata are the inputs from users related to the media asset. For example, the media guidance application may determine that inputs that match the metadata (e.g., inputs from users viewing the Giants vs. Dodgers baseball game) are the inputs from the users related to the media asset (e.g., the Giants vs. Dodgers baseball game).

Based on the inputs, the media guidance application may search the database for information related to the inputs from the users. The media guidance application may retrieve an entry from the database corresponding to an input from the users. The media guidance application may determine, from the entry, information about the input. For example, the media guidance application may search the database for information related to the inputs from the users. The media guidance application may retrieve entries from the database corresponding to inputs from the users. The media guidance application may determine, from the inputs, information (e.g., recording information, channel tuning information, etc.) related to the inputs from the users.

The media guidance application may determine, from the information, candidate inputs that contain information indicating that the media asset will be transmitted outside of the scheduled time slot. The media guidance application may determine candidate inputs that contain information indicating that the media asset will be transmitted outside of the scheduled time slot using the methods described below. For example, the media guidance application may determine from the recording information, as described below, that users extended the recording of the baseball game when watching the game live.

In some embodiments, when the media guidance is determining, from the information, candidate inputs that contain information indicating that the media asset will be transmitted outside of the scheduled time slot, the media guidance application may determine, from the information, candidate inputs in the plurality of inputs, where the information for the candidate inputs reflects that the media asset recording during the scheduled time slot is adjusted to a second end time.

In some embodiments, the media guidance application may determine that the information for the candidate inputs reflects that the media asset recording during the scheduled time slot is adjusted to a second end time based on user recording data from the information. The media guidance application may determine, from the user recording data, whether the user corresponding to the candidate input manually extended the recording outside of the scheduled time slot. For example, the media guidance application may determine, from the user recording data (e.g., the user manually adjusted the recording of the Giants vs. Dodgers baseball game at 9:55 pm to record an additional 30 minutes, to now finish recording at 10:30 pm), that the information for the candidate input reflects that the media asset (e.g., Giants vs. Dodgers baseball game) recording during the scheduled time slot (e.g., the scheduled time slot from 7:00 pm to 10:00 pm) is adjusted to a second end time (e.g., 10:30 pm) based on the user recording data from the information.

In some embodiments, the media guidance application may determine that the user corresponding to the candidate input manually extended the recording outside of the scheduled time slot if the user extended the recording within a threshold period of time before the end time of the scheduled time. The media guidance application may retrieve the threshold period of time from the default threshold period of time found in the guidance data, which may be adjustable via user input. For example, the media guidance application may determine that the user corresponding to the candidate input manually extended the recording outside of the scheduled time slot (e.g., extended the recording at 9:51 pm for an additional 30 minutes) within a threshold period of time (e.g., 15 minutes before the end time of the scheduled time slot).

In some embodiments, the media guidance application may determine that the threshold period of time is dependent on the genre of the media asset being recorded. The media guidance application may determine the genre of the media asset from metadata for the media asset. The media guidance application may retrieve, from a data structure in the guidance data, an entry corresponding to the genre of the media asset. The media guidance application may determine, from the entry, the threshold period of time for the corresponding genre. The media guidance application may determine that the thresholds in each entry are default threshold period of time defined by an editor, which may be adjustable via user input.

For example, the media guidance application may determine, from the metadata, the genre (e.g., genre: sports) for the media asset (e.g., Giants vs. Dodgers baseball game). The media guidance application may retrieve, from the entry in the data structure corresponding to the genre (e.g., sports), the threshold period of time (e.g., 15 minutes).

In some embodiments, when the media guidance is determining, from the information, candidate inputs that contain information indicating that the media asset will be transmitted outside of the scheduled time slot, the media guidance application may determine, from the information, candidate inputs in the plurality of inputs, where the information for the candidate inputs reflects that a user corresponding to each candidate input remains tuned to a content source that transmits the media asset after the end time. For example, the media guidance application may determine candidate inputs whose corresponding information (e.g., inputs where the users watching the baseball game do not tune to a different channel after the end of the scheduled time slot) indicates that the user corresponding to the candidate input remains tuned to the baseball game.

In some embodiments, the media guidance application may determine candidate inputs where the information reflects that a user corresponding to each candidate input remains tuned to a content source that transmits the media asset after the end time from the user's channel tuning data. The media guidance application may retrieve tuning information from the guidance data related to the media asset. The media guidance application may determine, from the tuning information, inputs where the content source was not changed after the end time of the scheduled recording slot. The media guidance application may determine that that the inputs where the content source was not changed after the end time correspond to candidate inputs.

For example, the media guidance application may retrieve tuning data (e.g., a data set that creates an entry every time the user tunes to a different channel) from the guidance data. The media guidance application may determine, from the tuning data (e.g., entries corresponding to users that did not tune to a different channel after the end time of the scheduled time slot for the Giants vs. Dodgers game), inputs where the content source (e.g., the channel playing the Giants vs. Dodgers game) was not changed after the end time corresponding to candidate inputs.

The media guidance application may determine, from the candidate inputs, that the media asset will be transmitted outside of the scheduled time slot. For example, the media guidance application may determine, from the candidate inputs (e.g., the recording data and channel data), using the methods described below, that the Giants vs. Dodgers game will be transmitted outside of the scheduled time slot.

In some embodiments, when the media guidance application is determining, from the candidate inputs, that the media asset will be transmitted outside of the scheduled time slot, the media guidance application may determine, using a model, whether the candidate inputs show that the media asset will be transmitted outside of the scheduled time slot. For example, the media guidance application may use a confidence analysis to determine whether the candidate inputs show that the media asset (e.g., the Giants vs. Dodgers baseball game) will be transmitted outside of the scheduled time.

In some embodiments, the media guidance application may use a confidence analysis as the model. The media guidance may determine, from the confidence analysis, a confidence score, as described below.

In some embodiments, the media guidance application may determine, from the confidence analysis, a confidence score based on the candidate inputs. The media guidance application may sort the candidate inputs into groups, weight the resulting groups, and determine the confidence score from the weighted groups.

In some embodiments, the media guidance application may sort the candidate inputs into groups based on a sorting criteria. The media guidance application may determine that the sorting criteria sorts candidate inputs into groups based on type. The media guidance application may determine that there are two main types of candidate inputs in a plurality of types: candidate inputs determined by the recording being modified and candidate inputs determined by the content source not being changed after the end time.

The media guidance application may determine the type of each candidate input based on the methods described above. For example, the media guidance application may determine that a candidate input fits into the "content source not being changed after the end time" type based on the tuning data of the candidate input. As another example, the media guidance application may determine that a candidate input fits into the "recording being modified" type from the user recording data indicating that the user adjusted the end time of the scheduled recording.

After determining the type of each candidate input, the media guidance application may sort the candidate inputs into groups based on type. For example, the media guidance application may sort the candidate inputs into a "recording being modified" group and a "content source not being changed after the end time" group based on the corresponding types.

In some embodiments, the media guidance application may assign a weight to each group. The media guidance application may assign a weight to each group that corresponds to said group's reliability. As referred to herein, the terms "reliability" should be understood to mean a group's accuracy in predicting that the media asset will extend beyond its scheduled timeslot.

In some embodiments, the media guidance application may determine that the weight of a group that corresponds to said group's reliability is a constant. The media guidance application may retrieve the constant corresponding to the group from a lookup table in the guidance data, wherein the lookup table is populated with values defined by an editor, which may be adjusted via user input. For example, the media guidance application may determine the weight of the "recording being modified" group by retrieving a constant (e.g., the constant may be equal to the integer five) corresponding to the "recording being modified" group in a lookup table in the guidance data.

In some embodiments, the media guidance application may determine that the weight of a group that corresponds to said group's reliability is inversely proportional to the average time left between the user modifying the recording and the scheduled end time of the program. The media guidance application may calculate the average time left by subtracting from the end time a current time, which may be retrieved from the tuning data in the media guidance data. For example, the media guidance application may determine that the weight of a group (e.g., the "recording being modified" group) is inversely proportional to the average time left (e.g., five minutes) between the user modifying the recording (e.g., a user modified the recording at 8:55 pm) and the scheduled end time of the program (e.g., 9:00 pm). The media guidance application may determine that the weighted average is inversely proportional to the average time left (e.g., 1/average_time=1/5).

The media guidance application may assign individual weights to each candidate input in the group corresponding to a weight based on the time at which the user performed an action (e.g., extended the recording) that made the input a candidate input. The media guidance application may sum the individually weighted candidate inputs and set the result to be the group's weighted confidence score. The media guidance application may determine that the group's weighted confidence score will increase dramatically as more users modify recordings closer to the scheduled end time of the program.

For example, the media guidance application may assign individual weights to each candidate input (e.g., candidate input 1 extended the recording by 15 minutes at 8:45 pm, candidate input 2 extended the recording by 10 minutes at 8:55 pm, and candidate input 3 extended the recording by five minutes at 8:59 pm) in the "modifying the recording" group. The media guidance application may determine that the weight is inversely proportional to the average time between the user modifying the recording and the scheduled end time of the program. The media guidance application may calculate the weights for each candidate input (e.g., candidate input 1's weight=1/15, candidate input 2's weight=1/5, and candidate input 3's weight=1/1). The media guidance application may sum the weights (e.g., 1/15+1/5+1/1=19/15) and set the result to be the "modifying the recording" group's weighted confidence score.

In some embodiments, the media guidance application may multiply the assigned weight of a group to the group's base value to determine the group's weighted confidence score. As referred to herein, the term "base value" should be understood to mean a value assigned to a group that is directly proportional to or equal to the number of unique users contained within the group. For example, the media guidance application may determine that a group's weighted confidence score will increase with the number of users modifying the recordings due to the linear relationship between the assigned weight of the group and the increasing value of the group's base value (e.g., the base value increases as more unique users modify the recording's end time).

The media guidance application may determine that the confidence score is the sum of the groups' weighted confidence scores. For example, the media guidance application may determine that the confidence score is the sum of the weighted "recording being modified" group's confidence score (e.g., five times the number of unique users in the group) and the weighted "content source not being changed after the end time" group's confidence score (e.g., two times the number of unique users in the group), each of which may be determined using the methods described above. For example, the media guidance application may determine, from a confidence analysis algorithm, a confidence score (e.g., a score between 1-100) for the Giants vs. Dodgers baseball game.

The media guidance application may determine, from the confidence score, whether the media asset will be transmitted outside of the scheduled time slot. For example, the media guidance application may compare the confidence score with a threshold confidence percentage to determine if the Giants vs. Dodgers baseball game will be transmitted outside of the scheduled time slot.

In some embodiments, when the media guidance application is determining, from the confidence score, whether the media asset will be transmitted outside of the scheduled time slot, the media guidance application may retrieve a threshold percentage. For example, the media guidance application may retrieve a default threshold percentage from the media guidance data, defined by an editor, which may be adjustable based on user input.

The media guidance application may compare the confidence score with the threshold percentage. For example, the media guidance application may determine that the Giants vs. Dodgers game has a confidence score of 90, and may compare the confidence score with a threshold percentage (e.g., 75%) that may be retrieved from the media guidance data.

In response to determining that the confidence score exceeds the threshold percentage, the media guidance application may determine that the media asset will be transmitted outside of the scheduled time slot. For example, the media guidance application may determine that the Giants vs. Dodgers baseball game will be transmitted outside of the scheduled time slot due to the confidence score (e.g., 90) exceeding the threshold percentage (e.g., 75%).

In response to determining that the confidence score does not exceed the threshold percentage, the media guidance application may determine that the media asset will not be transmitted outside of the scheduled time slot. For example, the media guidance application may determine that the Giants vs. Dodgers baseball game will not be transmitted outside of the scheduled time slot due to the confidence score (e.g., may be 50) not exceeding the threshold percentage (e.g., 75%).

In response to determining that the media asset will be transmitted outside of the scheduled time, the media guidance application may extend the recording of the media asset beyond the scheduled time slot by a predetermined amount of time. For example, the media guidance application may extend the recording of the Giants vs. Dodgers game by the average recording extension time calculated based on the candidate inputs, as described below.

In some embodiments, when, in response to determining that the media asset will be transmitted outside of the scheduled time, the media guidance application extends the recording of the media asset beyond the scheduled time slot by a predetermined amount of time, the media guidance application may retrieve, from a user profile, a default recording extension time. For example, the media guidance application may retrieve a default recording extension time (e.g., may be 15 minutes) from the user profile.

The media guidance application may select the default recording extension time to be the predetermined time. For example, the media guidance may select the default recording extension time (e.g., 15 minutes) to be the predetermined time.

In some embodiments, when, in response to determining that the media asset will be transmitted outside of the scheduled time, the media guidance application extends the recording of the media asset beyond the scheduled time slot by a predetermined amount of time, the media guidance application may determine, from the candidate inputs, an average time the candidate inputs extended the recording of the media asset. The media guidance application may retrieve, from the candidate inputs, a plurality of times by which the candidate inputs extended the recording of the media asset. The media guidance application may calculate the average of the times by summing the plurality of times, and then dividing by the total number of times in the plurality of times.

For example, the media guidance application may retrieve from the candidate inputs a plurality of times (e.g., 10 min, 15 min, 8 min, 30 min, 24 min) by which the candidate inputs extended the recording of the media asset. The media guidance application may calculate the average of the times by summing the plurality of times (e.g., 10+15+8+30+27=90) and then dividing by the total number of times (e.g., 90 min % 5 times=18 min). Thus, the media guidance application may determine the average time (e.g., 18 min) the candidates extended the recording of the media asset (e.g., Giants vs. Dodgers baseball game).

The media guidance application may select the average time to be the predetermined time. For example, the media guidance application may select the predetermined time to be the average time the candidate inputs extended the recording of the media asset (e.g., 18 minutes).

In some embodiments, when, in response to determining that the media asset will be transmitted outside of the scheduled time, the media guidance application extends the recording of the media asset beyond the scheduled time slot by a predetermined amount of time, the media guidance application may determine, from the candidate inputs, a medium time the candidate inputs extended the recording of the media asset. The media guidance application may retrieve, from the candidate inputs, a plurality of times by which the candidate inputs extended the recording of the media asset. The media guidance application may calculate the medium of the times by determining, if there is an odd number of times, the middle number from a numerically ordered list of the times. The media guidance application may calculate the medium of the times by determining, if there is an even number of times, the average of the two central numbers from a numerically ordered list of the times.

For example, the media guidance application may retrieve from the candidate inputs a plurality of times (e.g., 8 min, 10 min, 15 min, 24 min, 30 min) by which the candidate inputs extended the recording of the media asset. The media guidance application may calculate the medium of the odd number of times (e.g., five times) by determining the middle number of a numerically ordered list of times (e.g., 15 minutes). Thus, the media guidance application may determine the medium time (e.g., 15 min) the candidates extended the recording of the media asset (e.g., Giants vs. Dodgers baseball game).

The media guidance application may add the predetermined time to the end time, to create a second end time. For example, the media guidance application may add the predetermined time (e.g., 15 minutes) to the end time (e.g., may be 10:00 pm), to create a second end time (e.g., 10:15 pm).

The media guidance application may adjust the recording of the media asset to record from the start time to the second end time. For example, the media guidance application may adjust the recording of the Giants vs. Dodgers baseball game to record from the start time (e.g., 7:00 pm) to the second end time (e.g., 10:15 pm).

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
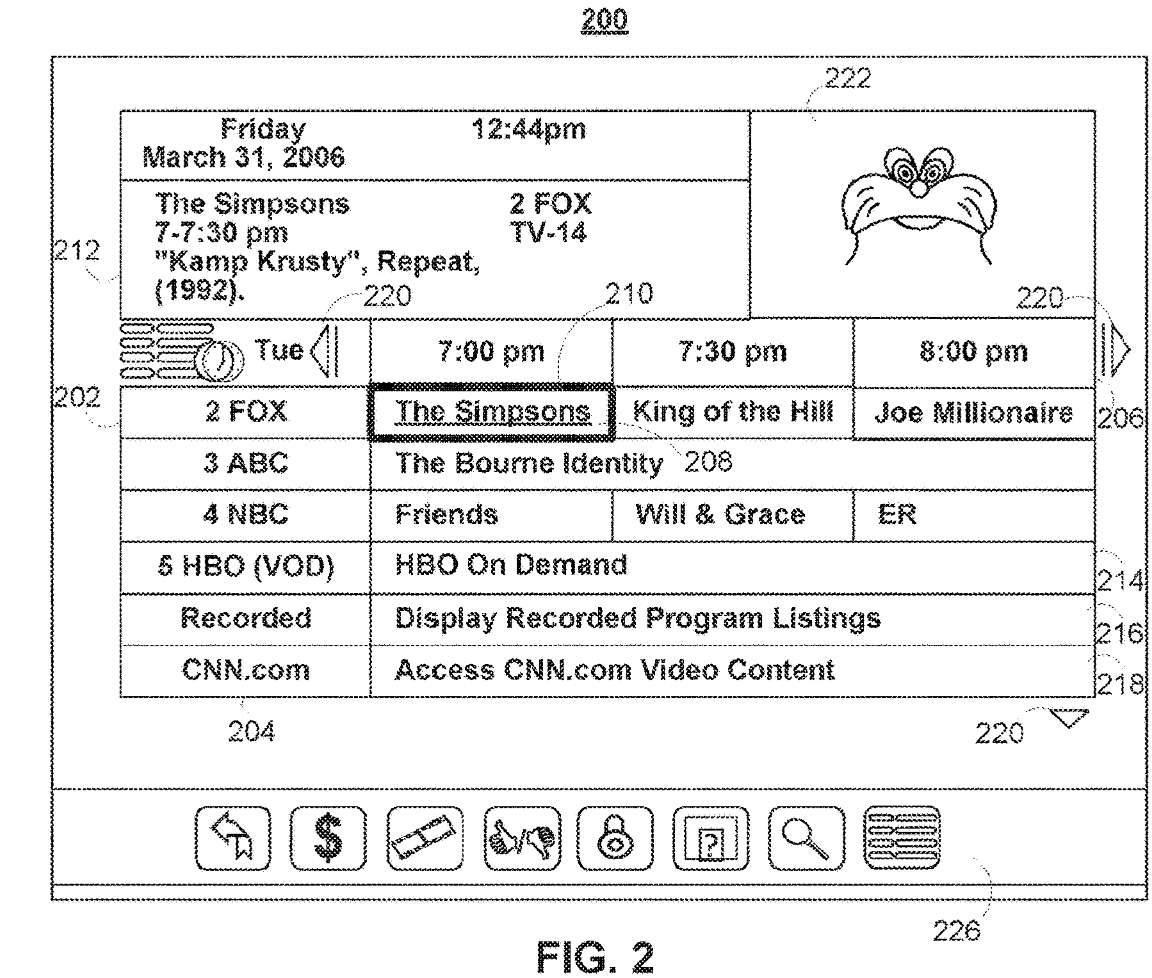
FIG. 2 shows an illustrative embodiment of a display screen that may be used to provide media guidance application listings and other media guidance information, in accordance with some embodiments of the disclosure.
Figure 3:
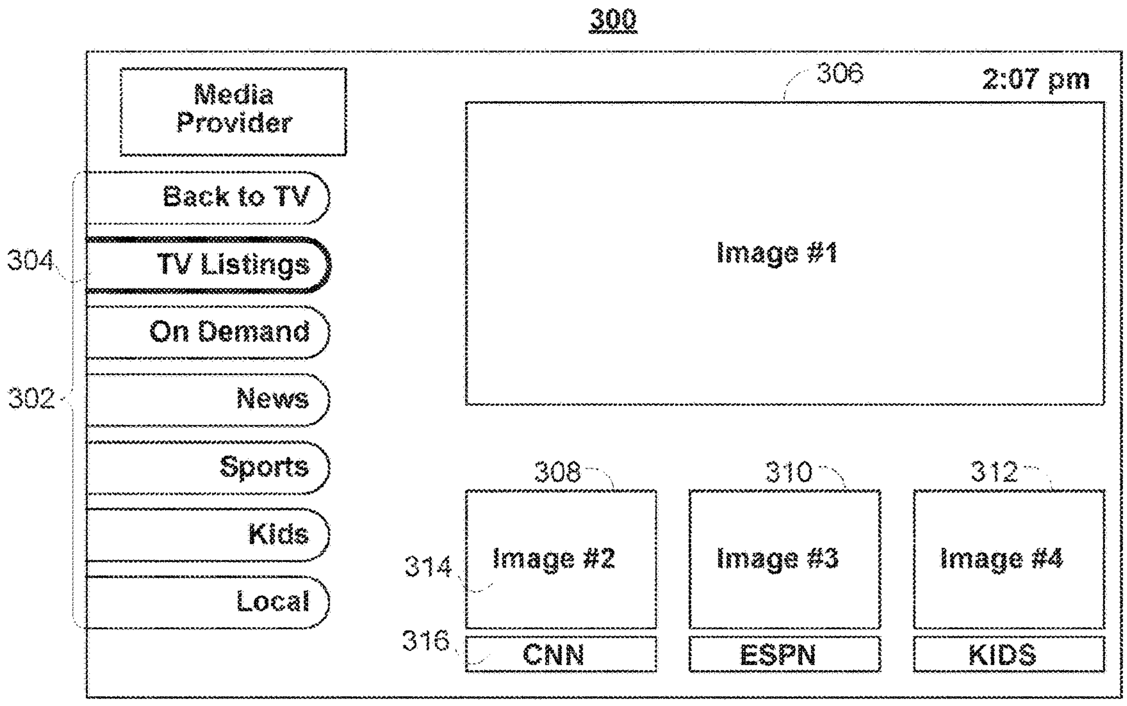
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
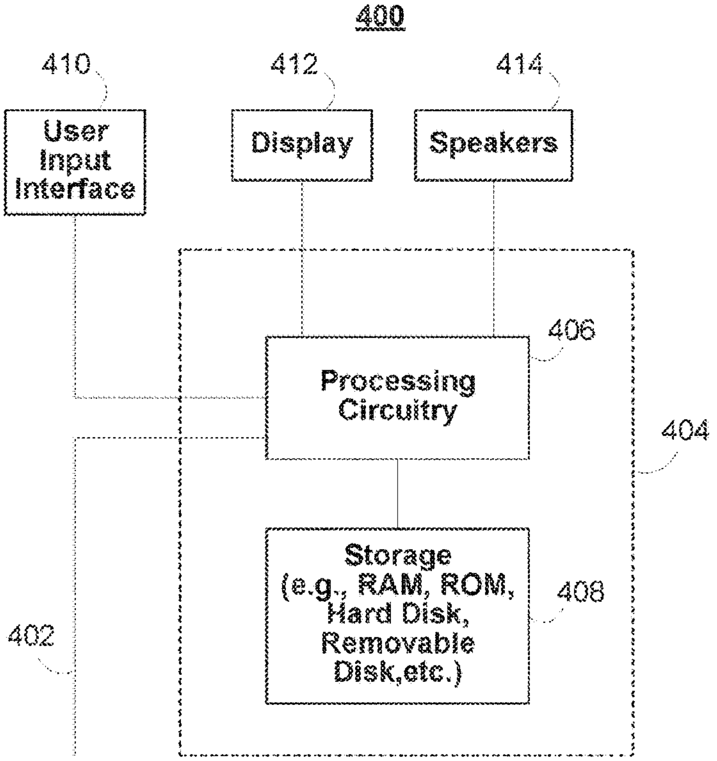
FIG. 4 is a block diagram of an illustrative user equipment (UE) device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
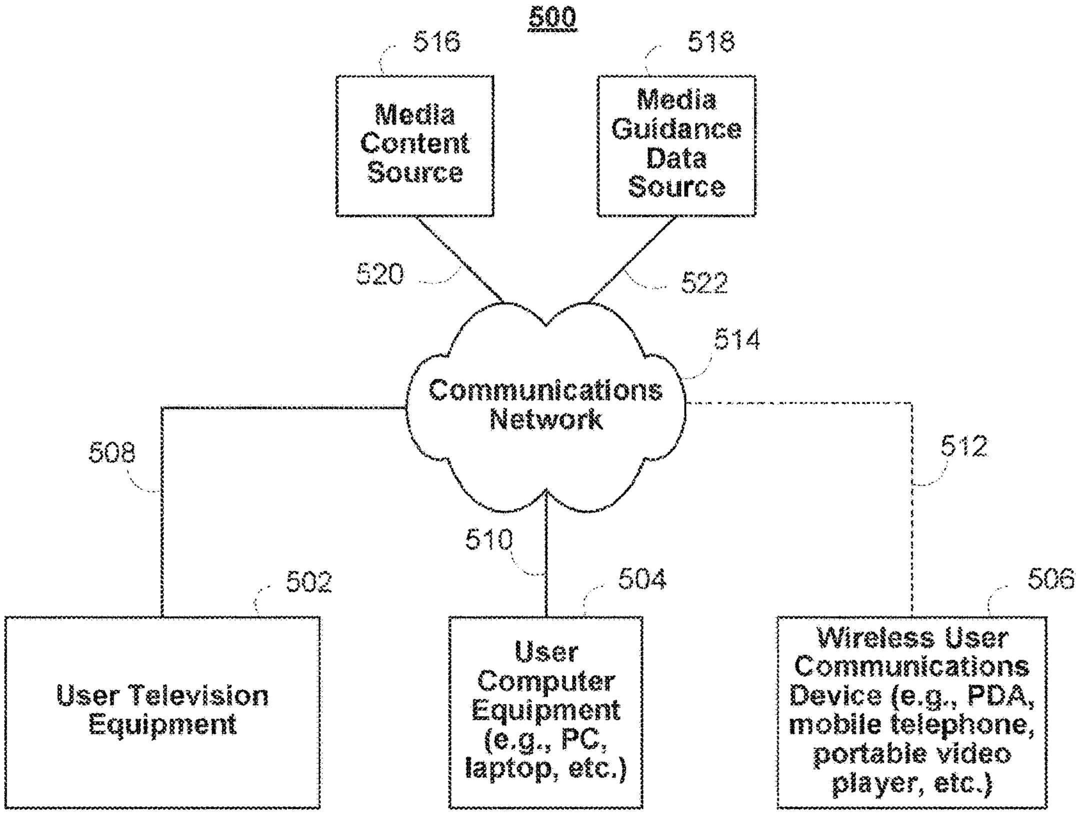
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
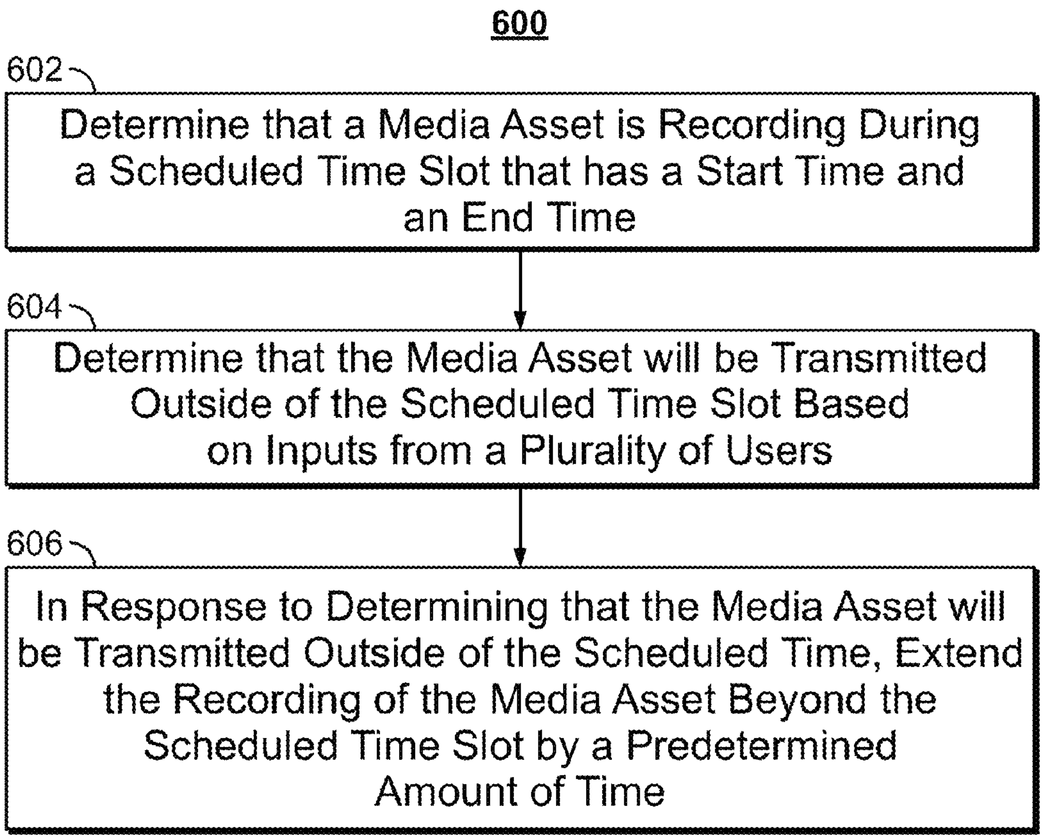
FIG. 6 depicts an illustrative flowchart of a process for determining whether to extend the recording of the media asset.

FIG. 6 depicts an illustrative flowchart of a process for determining whether to extend the recording of the media asset, in accordance with some embodiments of the disclosure. Process 600 may be executed by control circuitry 404 (e.g., in a manner instructed to control circuitry 404 by the media guidance application). Control circuitry 404 may be part of user equipment (e.g., user equipment 100, which may have any or all of the functionality of user television equipment 502, user computer equipment 504, and/or wireless communications device 506), or of a remote server separated from the user equipment by way of communication network 514.

Process 600 begins at 602, where control circuitry 404 determines that a media asset is recording during a scheduled time slot that has a start time and an end time. Control circuitry 404 retrieves recording information from media guidance data source 518. Control circuitry compares, using processing circuitry 406, the media asset to the recording information to determine whether the media asset is recording during a scheduled time slot.

At 604, control circuitry 404 determines that the media asset will be transmitted outside of the scheduled time slot based on inputs from a plurality of users. Control circuitry 404 determines whether the media asset will be transmitted outside of the scheduled time slot using the same methods as described in detail above. For example, control circuitry 404 may use a confidence analysis to determine whether the media asset will be transmitted outside of the scheduled time slot. At 606, in response to determining that the media asset will be transmitted outside of the scheduled time, control circuitry 404 extends the recording of the media asset beyond the scheduled time slot by a predetermined amount of time. Control circuitry 404 adjusts the storage space allocated for the recording in storage 408 to accommodate the size of the extended recording. Control circuitry 404 records the media asset until the second end time into the allocated space in storage 408.

Figure 7:
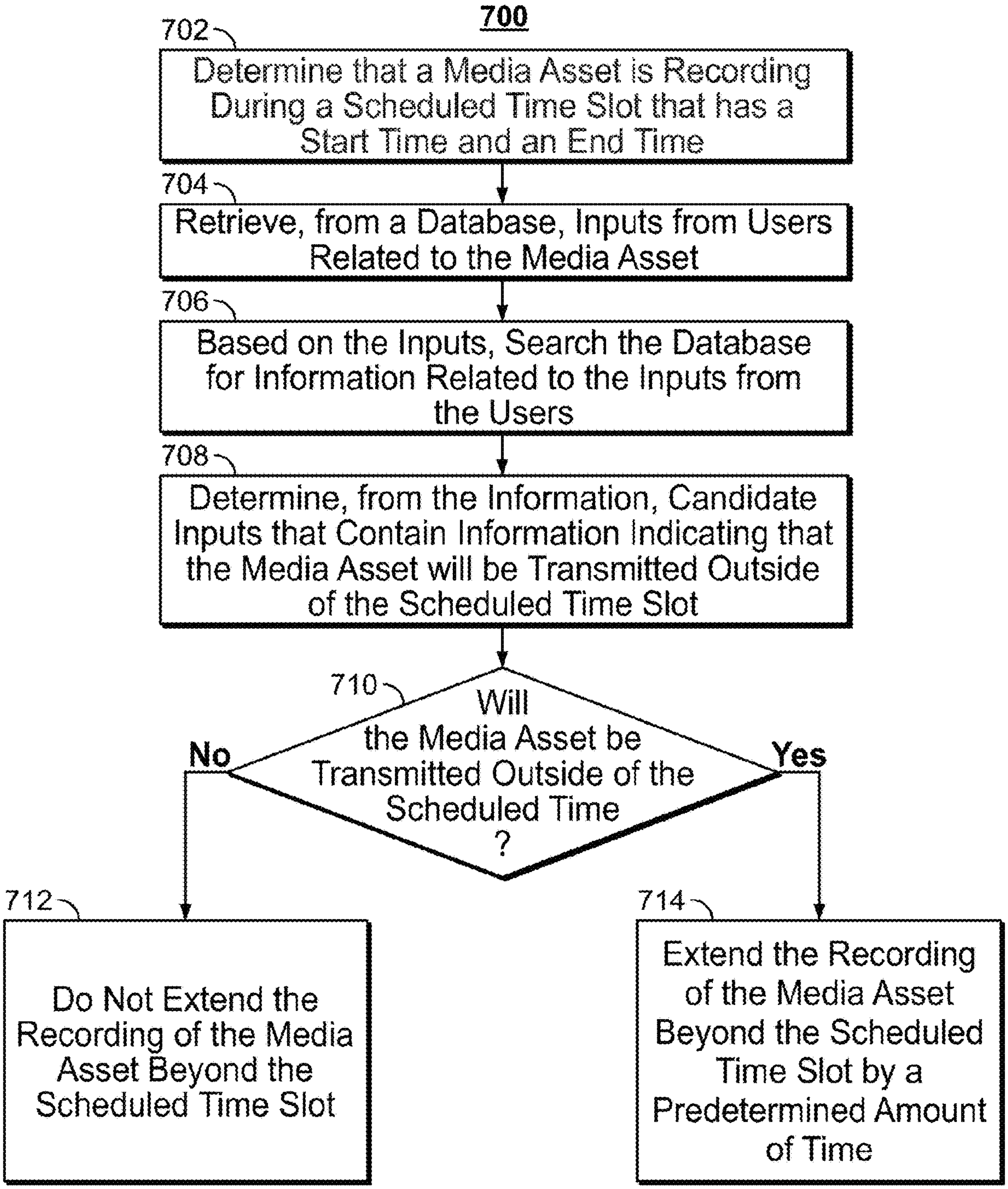
FIG. 7 depicts an illustrative flowchart of a process for determining whether to extend the recording of the media asset.

FIG. 7 depicts an illustrative flowchart of a process for determining whether to extend the recording of the media asset, in accordance with some embodiments of the disclosure. Process 700 begins at 702, where control circuitry 404 determines that a media asset is recording during a scheduled time slot that has a start time and an end time. Control circuitry 404 determines that the media asset is recording from the recording data in media guidance data source 518. At 704, control circuitry 404 retrieves, from a database, inputs from users related to the media asset. Control circuitry 404 retrieves the inputs from a database in media guidance source 518. For example, control circuitry 404 may retrieve user inputs from an input database in media guidance source 518.

At 706, based on the inputs, control circuitry 404 searches the database for information related to the inputs from the users. Control circuitry 404 searches the database for information related to the inputs from the users using the same methods described in detail above. For example, control circuitry 404 may search the database for information (e.g., recording information, tuning information, etc.) related to the inputs from the users. At 708, control circuitry 404 determines, from the information, candidate inputs that contain information indicating that the media asset will be transmitted outside of the scheduled time slot.

At 710, control circuitry 404 determines, from the candidate inputs, that the media asset will be transmitted outside of the scheduled time slot. If, at 710, control circuitry 404 determines that "No," the media asset will not be transmitted outside the scheduled time slot, then process 710 proceeds to 712. At 712, control circuitry 404 does not extend the recording of the media asset beyond the scheduled time. For example, control circuitry 404 may not extend the recording of the media asset beyond the scheduled time, and may not allocate additional space in storage 408 for the media asset.

If, at 710, control circuitry 404 determines that "Yes," the media asset will be transmitted outside the scheduled time slot, then process 710 proceeds to 714. At 714, control circuitry 404 extends the recording of the media asset beyond the scheduled time slot by a predetermined amount of time. For example, control circuitry 404 may extend the recording of the media asset beyond the scheduled time by adjusting the end time of the recording stored in media guidance data source 518, and may allocate additional space in storage 408 for the media asset sufficient to fit the additional recording time.

Figure 8:
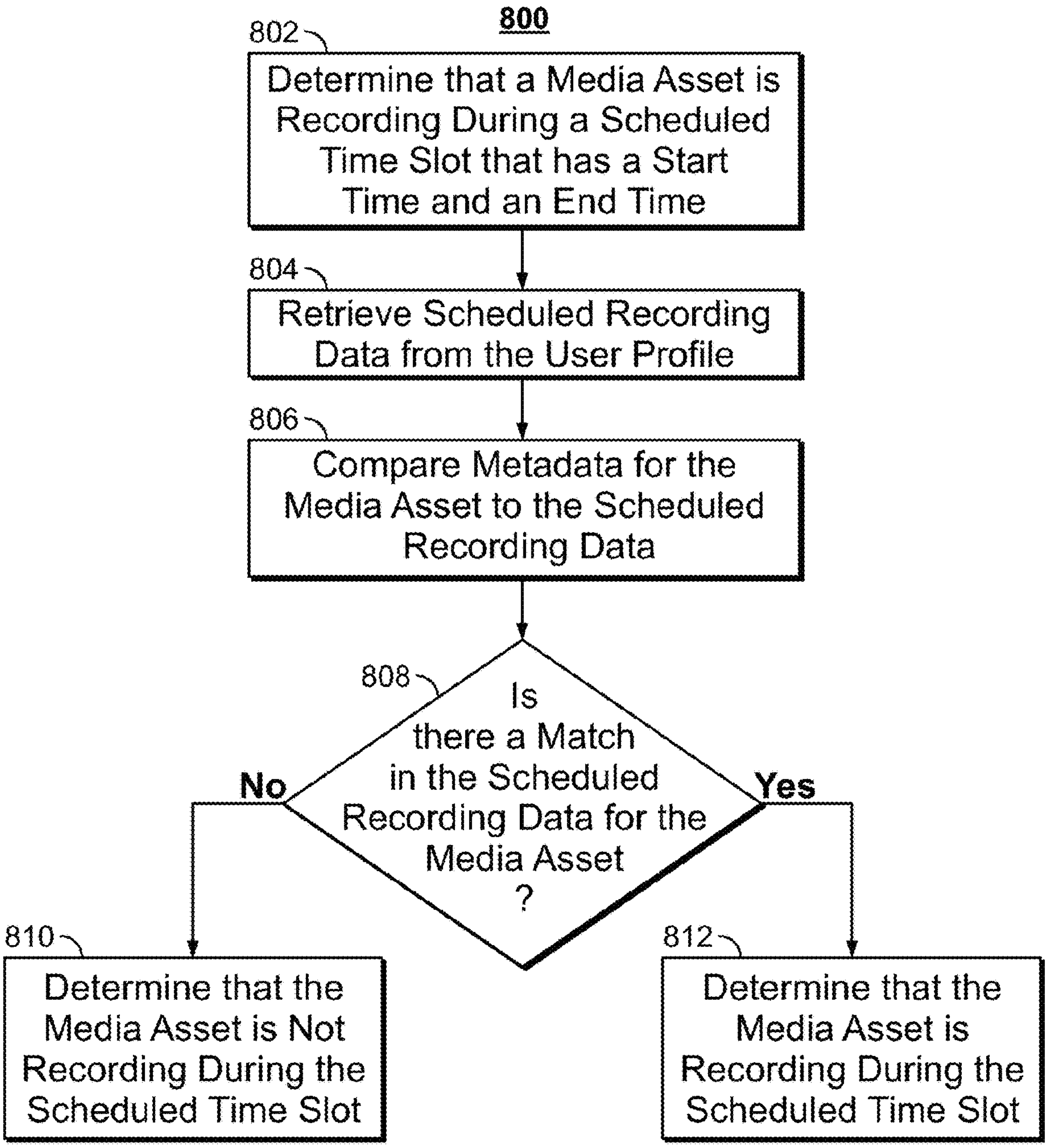
FIG. 8 depicts an illustrative flowchart of a process for determining whether the media asset is recording during the scheduled time slot.

FIG. 8 depicts an illustrative flowchart of a process for determining whether the media asset is recording during the scheduled time slot, in accordance with some embodiments of the disclosure. Process 800 begins at 802, where control circuitry 404 determines that a media asset is recording during a scheduled time slot that has a start time and an end time. Control circuitry 404 determines that a media asset is recording using similar methods as described above.

At 804, control circuitry 404 retrieves scheduled recording data from the user profile. The scheduled recording data may be stored in storage 408, or may be stored on a remote server and accessed via communications 514. At 806, control circuitry 404 compares metadata for the media asset to the scheduled recording data. Control circuitry 404 retrieves metadata for the media asset from media guidance data source 518. Control circuitry 404 uses processing circuitry 406 to compare the metadata for the media asset to the scheduled recording data.

At 808, control circuitry 404 determines whether there is a match in the scheduled recording data for the media asset. For example, control circuitry 404 determines from the metadata (e.g., Giantsvs.Dodgers:channel206:ESPN:7:00pm-10:00pm:4.21.2017) that there is a match for the media asset in the scheduled recording data (e.g., scheduled to record: channel206:7:00pm-10:00pm:4.21.2017).

If, at 808, control circuitry 404 determines that "No," there is not a match, then process 808 proceeds to process 810. At 810, control circuitry 404 determines that the media asset is not recording during the scheduled time slot. For example, control circuitry 404 may determine that there is not a match between the metadata for the Giants vs. Dodgers baseball game and the scheduled recording data, and thus the Giants vs. Dodgers game is not recording during the scheduled time slot.

If, at 808, control circuitry 404 determines that "Yes," there is a match, then process 808 proceeds to process 812. At 812, control circuitry 404 determines that the media asset is recording during the scheduled time slot. For example, control circuitry 404 may determine that there is a match between the metadata for the Giants vs. Dodgers baseball game and the scheduled recording data, and thus the Giants vs. Dodgers game is recording during the scheduled time slot.

Figure 9:
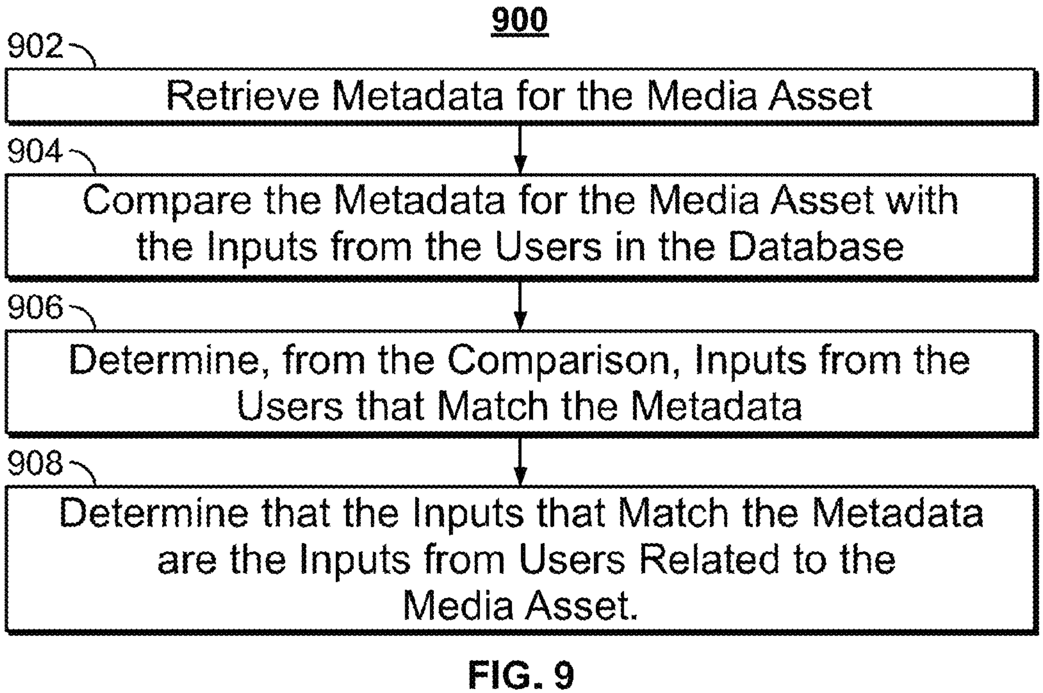
FIG. 9 depicts an illustrative flowchart of a process for determining the inputs from the users that are related to the media asset.

FIG. 9 depicts an illustrative flowchart of a process for determining the inputs from the users that are related to the media asset, in accordance with some embodiments of the disclosure. Process 900 begins at 902, where control circuitry 404 retrieves metadata for the media asset. Control circuitry 404 retrieves metadata for the media asset from media guidance content source 518. For example, control circuitry 404 may retrieve metadata for the Giants vs. Dodgers baseball game from media guidance content source 518. At 904, control circuitry 404 compares the metadata for the media asset with the inputs from the users in the database. Control circuitry 404 retrieves inputs from the users from a database in media guidance content source 518. Control circuitry 404 compares the metadata for the media asset with the inputs from the users using processing circuitry 406. At 906, control circuitry 404 determines, from the comparison, inputs from the users that match the metadata. For example, control circuitry 404 may determine inputs from the users (e.g., inputs related to the Giants vs. Dodgers baseball game) that match the metadata retrieved from media guidance content source 518. At 908, control circuitry 404 determines that the inputs that match the metadata are the inputs from users related to the media asset.

Figure 10:
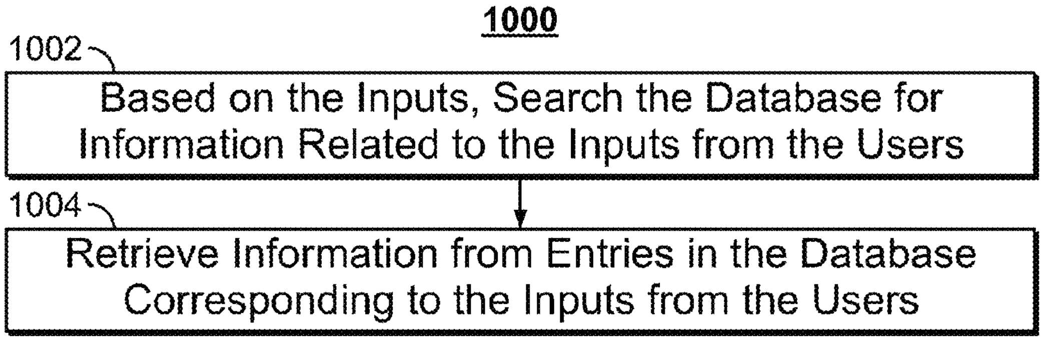
FIG. 10 depicts an illustrative flowchart of a process for retrieving information from the database corresponding to the inputs from the users.

FIG. 10 depicts an illustrative flowchart of a process for retrieving information from the database corresponding to the inputs from the users, in accordance with some embodiments of the disclosure. Process 1000 begins at 1002, where based on the inputs, control circuitry 404 searches the database for information relate to the inputs from the users. Control circuitry 404 searches a database in media guidance source data 518 for information related to the inputs from the users. At 1004, control circuitry 404 retrieves information from entries in the database corresponding to the inputs from the users. For example, control circuitry 404 may retrieve information from entries in the database corresponding to the inputs from the users related to the media asset (e.g., the Giants vs. Dodgers baseball game).

Figure 11:
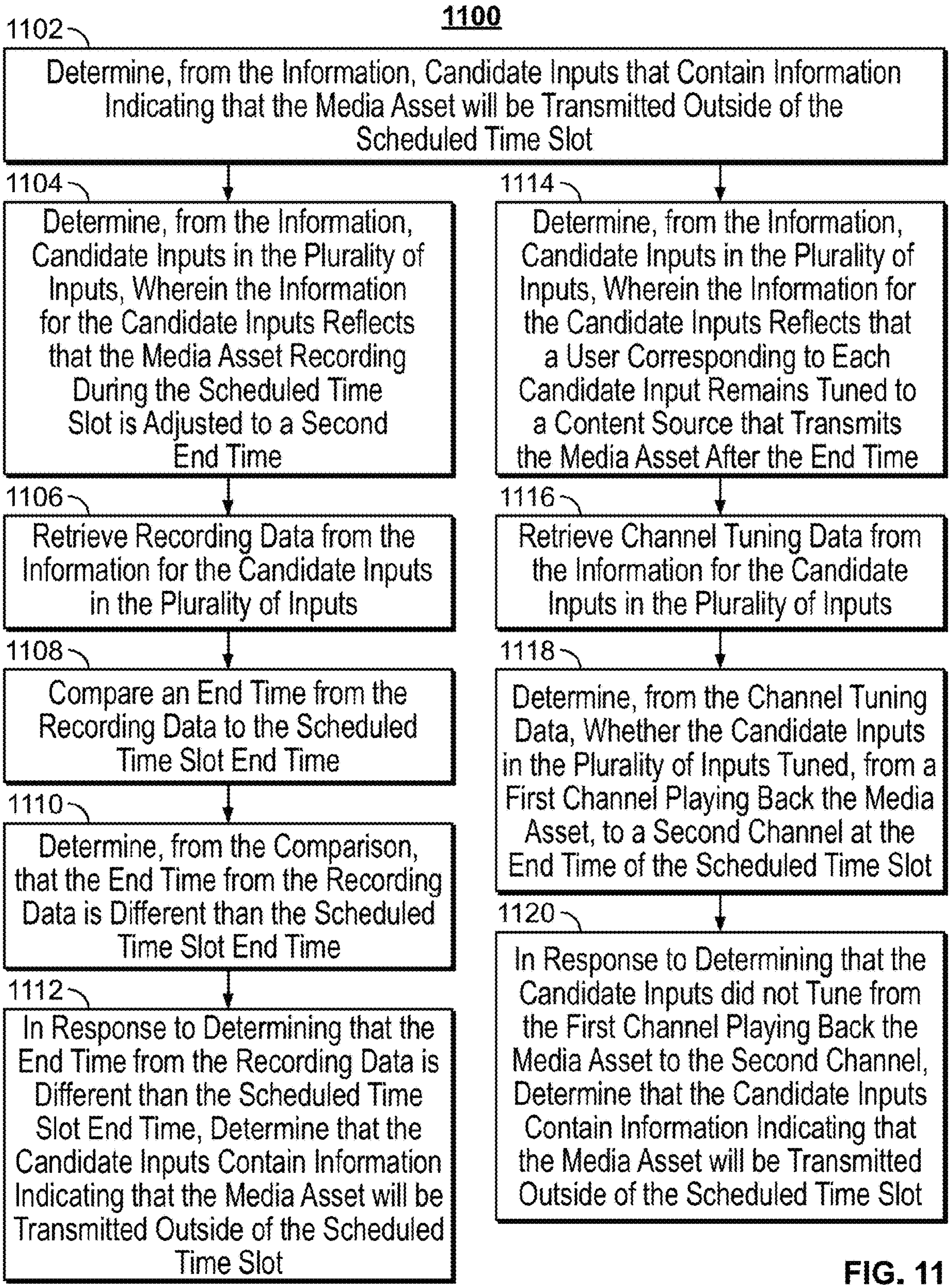
FIG. 11 depicts an illustrative flowchart of a process for determining candidate inputs that contain information indicating that the media asset will be transmitted outside of the scheduled time slot.

FIG. 11 depicts an illustrative flowchart of a process for determining candidate inputs that contain information indicating that the media asset will be transmitted outside of the scheduled time slot, in accordance with some embodiments of the disclosure. Process 1100 begins at 1102, where control circuitry 404 determines, from the information, candidate inputs that contain information indicating that the media asset will be transmitted outside of the scheduled time slot. Control circuitry 404 may retrieve a plurality of candidate inputs from media guidance data source 518. At 1104, control circuitry 404 determines, from the information, candidate inputs in the plurality of inputs, wherein the information for the candidate inputs reflects that the media asset recording during the scheduled time slot is adjusted to a second end time. For example, control circuitry 404 may determine, via a user input on user input interface 410, that the user adjusted the media asset recording to record to a second end time.

At 1106, control circuitry 404 retrieves recording data from the information for the candidate inputs in the plurality of inputs. Control circuitry 404 retrieves the recording data from the information for the candidate inputs from a database in media guidance source data 518.

At 1108, control circuitry 404 compares an end time from the recording data to the scheduled time slot end time. For example, control circuitry 404 may retrieve the scheduled time slot end time from the metadata for the media asset found in media guidance data source 518. Control circuitry 404 compares the end time from the recording data to the scheduled time slot end time using processing circuitry 406.

At 1110, control circuitry 404 determines, from the comparison, that the end time from the recording data is different than the scheduled time slot end time. For example, control circuitry 404 may determine that the end time from the recording data (e.g., 10:15 pm) is different than the scheduled time slot end time (e.g., 10:00 pm) using processing circuitry 406.

At 1112, in response to determining that the end time from the recording data is different than the scheduled time slot end time, control circuitry 404 determines that the candidate inputs contain information indicating that the media asset will be transmitted outside of the scheduled time slot. At 1114, control circuitry 404 determines, from the information, candidate inputs in the plurality of inputs, wherein the information for the candidate inputs reflects that a user corresponding to each candidate input remains tuned to a content source that transmits the media asset after the end time. For example, control circuitry 404 may retrieve tuning data from media guidance data source 518 that reflects that the user did not tune to another channel or content source, via a command on user input interface 510, after the end time of the media asset.

At 1116, control circuitry 404 retrieves channel tuning data from the information for the candidate inputs in the plurality of inputs. Control circuitry 404 retrieves channel tuning data from media guidance data source 518. At 1118, control circuitry 404 determines, from the channel tuning data, whether the candidate inputs in the plurality of inputs tuned, from a first channel playing back the media asset, to a second channel at the end time of the scheduled time slot.

At 1120, in response to determining that the candidate inputs did not tune from the first channel playing back the media asset to the second channel, control circuitry 404 determines that the candidate inputs contain information indicating that the media asset will be transmitted outside of the scheduled time slot. For example, control circuitry 404 may determine from the tuning data found in media guidance data source 518 that the user did not tune from the first channel playing back the Giants vs. Dodgers game to a second channel, and thus may determine that the candidate inputs contain information indicating that the media asset will be transmitted outside of the scheduled time slot.

Figure 12:
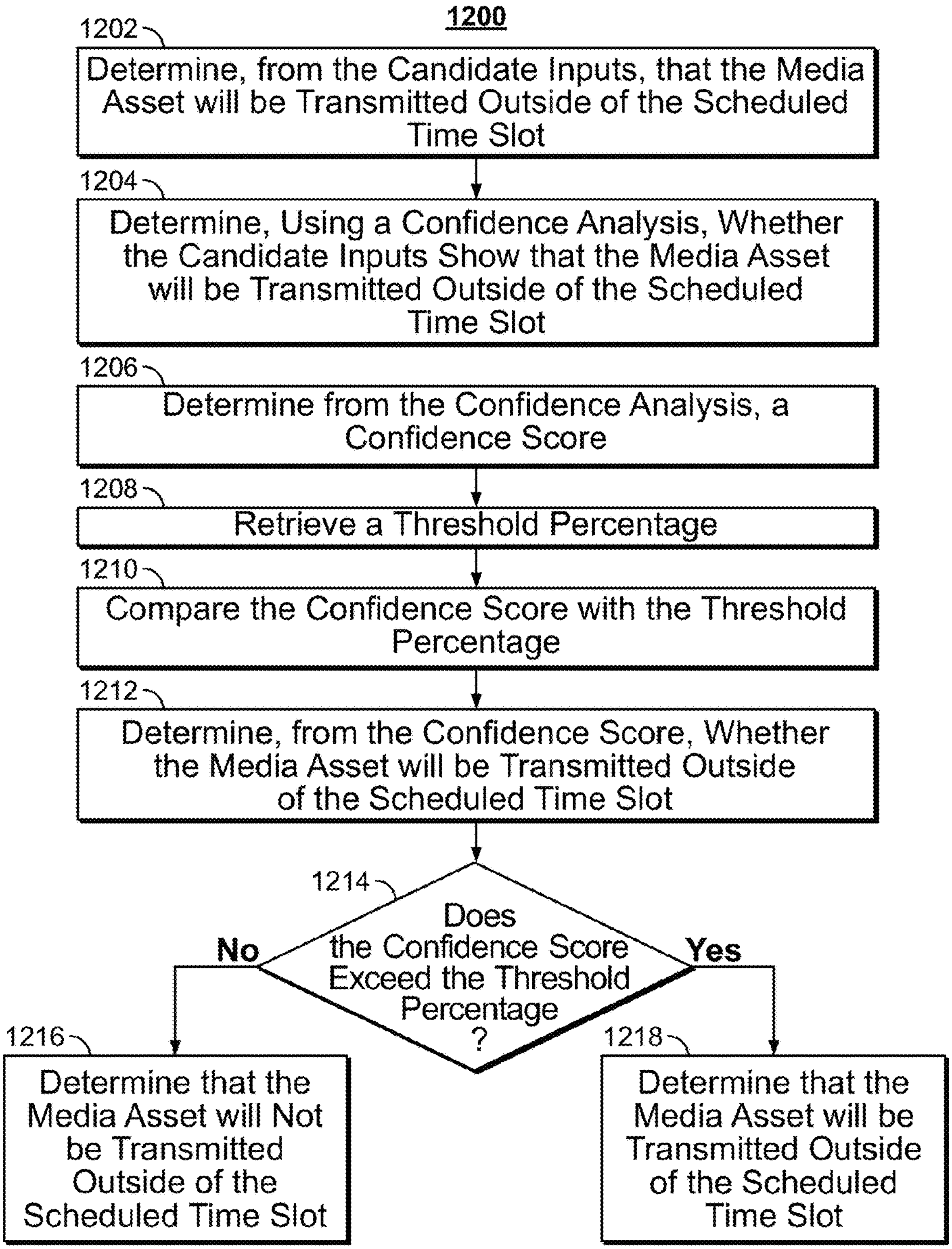
FIG. 12 depicts an illustrative flowchart of a process for determining, from the candidate inputs, that the media asset will be transmitted outside of the scheduled time slot.

FIG. 12 depicts an illustrative flowchart of a process for determining, from the candidate inputs, that the media asset will be transmitted outside of the scheduled time slot, in accordance with some embodiments of the disclosure. Process 1200 begins at 1202, where control circuitry 404 determines, from the candidate inputs, that the media asset will be transmitted outside of the scheduled time slot. Control circuitry 404 determines from the candidate inputs that the media asset will be transmitted outside of the scheduled time slot using similar methods as described above. For example, control circuitry 404 may determine, from candidate inputs that contain information indicating that a user, via user input interface 410, adjusted the end time of the scheduled recording to a second end time, that the media asset will be transmitted outside of the scheduled time slot.

As another example, control circuitry 404 may determine, from candidate inputs that contain information indicating, via data from media guidance data source 518, that a user remains tuned to a content source that transmits the media asset after the end time that the media asset will be transmitted outside of the scheduled time slot.

At 1204, control circuitry 404 determines, using a confidence analysis, whether the candidate inputs show that the media asset will be transmitted outside of the scheduled time slot. Control circuitry 404 uses processing circuitry 406 to determine the confidence analysis.

At 1206, control circuitry 404 determines, from the confidence analysis, a confidence score. Control circuitry 404 may determine the confidence score using similar methods as described above. For example, control circuitry 404 may use processing circuitry 406 to determine the confidence score based on weighted groups of candidate inputs sorted by type.

At 1208, control circuitry 404 retrieves a threshold percentage. Control circuitry 404 retrieves the threshold percentage from media guidance data source 518. The media guidance application may retrieve a default threshold percentage from a database in media guidance data source 518. The media guidance application may determine, via a user input from user input interface 410, that the user manually adjusted the threshold percentage. The media guidance application may store the adjusted threshold percentage in the database in threshold percentage location in media guidance data source 518.

At 1210, control circuitry 404 compares the confidence score with the threshold percentage. Control circuitry 404 uses processing circuitry 406 to compare the confidence score with the threshold percentage.

At 1212, control circuitry determines, from the confidence score, whether the media asset will be transmitted outside of the scheduled time slot. At 1214, control circuitry determines whether the confidence score exceeds the threshold percentage. Control circuitry 404 uses processing circuitry 406 to compare the confidence score to the threshold percentage to determine whether the confidence score exceeds the threshold percentage.

If, at 1214, control circuitry 404 determines that "No," the confidence score does not exceed the threshold percentage, then process 1214 proceeds to 1216. At 1216, control circuitry 404 determines that the media asset will not be transmitted outside of the scheduled time slot. For example, control circuitry 404 may determine that the media asset will not be transmitted outside of the scheduled time slot when the confidence score (e.g., 2) does not exceed the threshold percentage (e.g., 50%).

If, at 1214, control circuitry 404 determines that "Yes," the confidence score exceeds the threshold percentage, then process 1214 proceeds to 1218. At 1218, control circuitry 404 determines that the media asset will be transmitted outside of the scheduled time slot. For example, control circuitry 404 may determine that the media asset will be transmitted outside of the scheduled time slot when the confidence score (e.g., 80) exceeds the threshold percentage (e.g., 50%).

Figure 13:
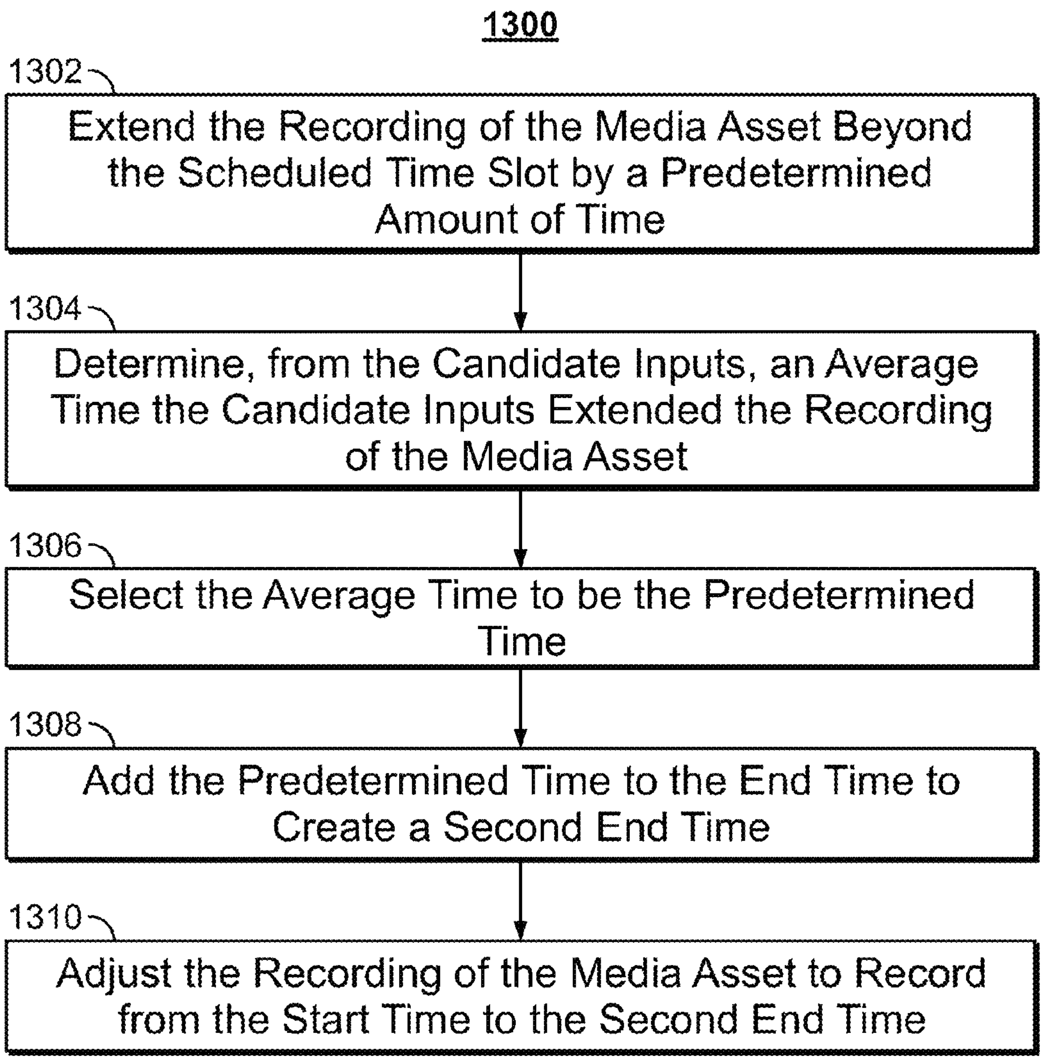
FIG. 13 depicts an illustrative flowchart of a process for extending the recording of the media asset beyond the scheduled time slot by a predetermined amount of time.

FIG. 13 depicts an illustrative flowchart of a process for extending the recording of the media asset beyond the scheduled time slot by a predetermined amount of time, in accordance with some embodiments of the disclosure. Process 1300 begins at 1302, where control circuitry 404 extends the recording of the media asset beyond the scheduled time slot by a predetermined amount of time. Control circuitry 404 extends the recording using the same methods as described in detail above. At 1304, control circuitry 404 determines, from the candidate inputs, an average time the candidate inputs extended the recording of the media asset. Control circuitry 404 retrieves the times each candidate input extended the recording by from a database in media guidance data source 518. Control circuitry 404 calculates the average time from the retrieved times using processing circuitry 406. At 1306, control circuitry 404 selects the average time to be the predetermined time. For example, control circuitry 404 may select the average time to be the predetermined time, and store the predetermined time in storage 408.

At 1308, control circuitry 404 adds the predetermined time to the end time to create a second end time. Control circuitry retrieves the end time from media guidance data source 518. Control circuitry 404 adds the predetermined time, from storage 408, to the end time using processing circuitry 406. At 1310, control circuitry 404 adjusts the recording of the media asset to record from the start time to the second end time. Control circuitry 404 adjusts the storage space allocated for the recording in storage 408 to accommodate the size of the extended recording. Control circuitry 404 records the media asset until the second end time into the allocated space in storage 408. Dynamically adjusting the storage space allows control circuitry 404 to allocate only the space needed to contain the complete recording, and thus increases the efficiency of storage 408.

It should be noted that processes 600-1300 or any step thereof could be performed on, or provided by, any of the devices shown in FIGS. 1 and 4-5. For example, any of processes 600-1300 may be executed by control circuitry 404 (FIG. 4) as instructed by control circuitry implemented on user equipment 502, 504, 506 (FIG. 5), and/or a user equipment device for selecting a recommendation. In addition, one or more steps of processes 600-1300 may be incorporated into or combined with one or more steps of any other process or embodiment.

It is contemplated that the steps or descriptions of each of FIGS. 6-13 may be used with any other embodiment of this disclosure. In addition, the steps and descriptions described in relation to FIGS. 6-13 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-13.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining a position of a user may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5. Furthermore, processing circuitry, or a computer program, may update settings of user equipment 100 stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method, comprising:

receiving a request to record a media asset that is scheduled to be transmitted during a time slot having a predetermined start time and a predetermined end time;

determining that the media asset is recording, on a device associated with a first user, during the time slot;

determining, using guidance data for the media asset, that the media asset will be transmitted past the predetermined end time, wherein the guidance data is associated with a second user and comprises information indicating that the second user has extended recording of the media asset, on a device associated with the second user, past the predetermined end time;

assigning a weight to the guidance data indicating the second user has extended the recording, wherein the assigned weight is inversely proportional to an average time left between a time the second user extended the recording and the predetermined end time; and adjusting an end time of the recording, on the device associated with the first user, from the predetermined end time to a later extended end time, wherein the later extended end time is based at least in part on an amount of time by which the second user has extended recording of the media asset and the weight.

2. The method of claim 1, wherein the guidance data comprises information indicating the second user is receiving a transmission of the media asset at a time later than the predetermined end time.

3. The method of claim 1, wherein the guidance data comprises information indicating that the second user is receiving a continuous transmission, from a content source that transmits the media asset, from a first time before the predetermined end time to a second time after the predetermined end time.

4. The method of claim 1, wherein determining that the media asset will be transmitted past the predetermined end time comprises determining that the second user has requested to extend recording of the media asset, on a device associated with the second user, within a threshold period of time before the predetermined end time.

5. The method of claim 1, wherein the guidance data comprises information indicating that (i) the second user is viewing the media asset on a first channel and (ii) the second user does not tune to a second channel after the predetermined end time.

6. The method of claim 1, wherein the later extended end time is a predetermined amount of time after the predetermined end time.

7. The method of claim 6, wherein the predetermined amount of time is determined based at least in part on a profile of the first user.

8. The method of claim 1, further comprising determining the media asset is a live event, wherein the determining that the media asset will be transmitted past the predetermined end time and adjusting the predetermined end time are performed based at least in part on determining the media asset is the live event.

9. A system, comprising:

communications circuitry; and control circuitry configured to:

receive a request to record a media asset that is scheduled to be transmitted during a time slot having a predetermined start time and a predetermined end time;

determine that the media asset is recording, on a device associated with a first user, during the time slot;

determine, using guidance data for the media asset, that the media asset will be transmitted past the predetermined end time, wherein the guidance data is associated with a second user and comprises information indicating that the second user has extended recording of the media asset, on a device associated with the second user, past the predetermined end time;

assign a weight to the guidance data indicating the second user has extended the recording, wherein the assigned weight is inversely proportional to an average time left between a time the second user extended the recording and the predetermined end time; and adjust an end time of the recording, on the device associated with the first user, from the predetermined end time to a later extended end time, wherein the later extended end time is based at least in part on an amount of time by which the second user has extended recording of the media asset and the weight.

10. The system of claim 9, wherein the guidance data comprises information indicating the second user is receiving a transmission of the media asset at a time later than the predetermined end time.

11. The system of claim 9, wherein the guidance data comprises information indicating that the second user is receiving a continuous transmission, from a content source that transmits the media asset, from a first time before the predetermined end time to a second time after the predetermined end time.

12. The system of claim 9, wherein the control circuitry is configured to determine that the media asset will be transmitted past the predetermined end time by determining that the second user has requested to extend recording of the media asset, on a device associated with the second user, within a threshold period of time before the predetermined end time.

13. The system of claim 9, wherein the guidance data comprises information indicating that (i) the second user is viewing the media asset on a first channel and (ii) the second user does not tune to a second channel after the predetermined end time.

14. The system of claim 9, wherein the later extended end time is a predetermined amount of time after the predetermined end time.

15. The system of claim 14, wherein the predetermined amount of time is determined based at least in part on a profile of the first user.

16. The system of claim 9, wherein the control circuitry further configured to:

determine the media asset is a live event, wherein the determining that the media asset will be transmitted past the predetermined end time and adjusting the predetermined end time are performed based at least in part on determining the media asset is the live event.

* * * * *